(12) United States Patent
Sukhman et al.

(10) Patent No.: US 8,294,062 B2
(45) Date of Patent: Oct. 23, 2012

(54) LASER BEAM POSITIONING SYSTEMS FOR MATERIAL PROCESSING AND METHODS FOR USING SUCH SYSTEMS

(75) Inventors: Yefim P. Sukhman, Scottsdale, AZ (US); Stefano J. Noto, Mesa, AZ (US); Cheryl Kaufman, Cave Creek, AZ (US)

(73) Assignee: Universal Laser Systems, Inc., Scottsdale, AZ (US)

( * ) Notice: Subject to any disclaimer, the term of this patent is extended or adjusted under 35 U.S.C. 154(b) by 1355 days.

(21) Appl. No.: 11/841,450

(22) Filed: Aug. 20, 2007

(65) Prior Publication Data

US 2009/0050611 A1    Feb. 26, 2009

(51) Int. Cl.
*B23K 26/06* (2006.01)
*G02B 26/10* (2006.01)
(52) U.S. Cl. ............ 219/121.74; 219/121.75; 359/201.1
(58) Field of Classification Search ............ 219/121.78, 219/121.79, 121.74, 121.73, 121.75; 359/201.1, 359/201.2, 202.1
See application file for complete search history.

(56) References Cited

U.S. PATENT DOCUMENTS

| | | | |
|---|---|---|---|
| 4,272,151 A | 6/1981 | Balasubramanian | |
| 4,289,378 A * | 9/1981 | Remy et al. | 219/121.83 |
| 4,373,774 A | 2/1983 | Dubroeucq et al. | |
| 4,797,749 A | 1/1989 | Paulsen | |
| 4,806,724 A * | 2/1989 | Kawai et al. | 219/121.74 |
| 4,944,817 A | 7/1990 | Bourell et al. | |
| 4,973,115 A | 11/1990 | Edwards et al. | |
| 5,035,476 A | 7/1991 | Ellis et al. | |
| 5,053,090 A | 10/1991 | Beaman et al. | |
| 5,121,247 A | 6/1992 | Fujita et al. | |
| 5,184,012 A | 2/1993 | Yamamoto | |
| 5,381,258 A | 1/1995 | Bordignon et al. | |
| 5,422,872 A | 6/1995 | Hsu et al. | |
| 5,463,418 A | 10/1995 | Tateoka | |
| 5,473,586 A | 12/1995 | Furuhata | |

(Continued)

FOREIGN PATENT DOCUMENTS

JP    62-84889 A   *   4/1987

OTHER PUBLICATIONS

Engelmeyer, Andreas, "Galvanometer Scanning Technology Speeds Up Laser Processing," SCANLAB innovators for industry, 4 pages, undated.

*Primary Examiner* — Geoffrey S Evans
(74) *Attorney, Agent, or Firm* — Perkins Coie LLP (57) ABSTRACT

Laser beam positioning systems for material processing and methods for using such systems are disclosed herein. One embodiment of a laser-based material processing system, for example, can include (a) a radiation source configured to produce a laser beam and direct the beam along a beam path, and (b) a laser beam positioning assembly in the beam path. The laser beam positioning assembly can include a first focusing element, first and second reflective optical elements, and a second focusing element. The first focusing element can focus the laser beam to a first focal point between the first and second reflective optical elements. The first and second reflective optical elements can direct the laser beam toward a material processing area while the laser beam has a decreasing or increasing cross-sectional dimension. The second focusing element can focus the laser beam and direct the beam toward the material processing area.

28 Claims, 5 Drawing Sheets

U.S. PATENT DOCUMENTS

| | | | |
|---|---|---|---|
| 5,535,293 A * | 7/1996 | Buchin | 385/18 |
| 5,561,544 A * | 10/1996 | Macken | 359/202.1 |
| 5,567,207 A * | 10/1996 | Lockman et al. | 8/444 |
| 5,644,424 A | 7/1997 | Backus et al. | |
| 5,646,765 A | 7/1997 | Laakmann et al. | |
| 5,670,069 A | 9/1997 | Nakai et al. | |
| 5,719,372 A * | 2/1998 | Togari et al. | 219/121.68 |
| 5,811,754 A * | 9/1998 | Nakatani et al. | 219/121.73 |
| 5,837,962 A | 11/1998 | Overbeck | |
| 5,932,871 A | 8/1999 | Nakagawa et al. | |
| 6,028,306 A | 2/2000 | Hayashi | |
| 6,034,804 A | 3/2000 | Bashkansky et al. | |
| 6,107,600 A * | 8/2000 | Kurosawa | 219/121.74 |
| 6,243,189 B1 | 6/2001 | Ribes et al. | |
| 6,528,758 B2 * | 3/2003 | Shaffer | 219/121.68 |
| 6,720,524 B1 | 4/2004 | Hamada | |
| 6,734,392 B2 | 5/2004 | Philipp et al. | |
| 6,887,231 B2 | 5/2005 | Mrochen et al. | |
| 7,005,602 B1 | 2/2006 | Howell | |
| 2002/0063113 A1 * | 5/2002 | Wiggermann et al. | 219/121.7 |
| 2004/0188401 A1 | 9/2004 | Mori et al. | |
| 2005/0045090 A1 * | 3/2005 | Ikegami et al. | 117/8 |
| 2005/0061781 A1 * | 3/2005 | Jense | 219/121.74 |
| 2006/0027537 A1 * | 2/2006 | Lambert et al. | 219/121.6 |
| 2006/0245084 A1 * | 11/2006 | Brustle et al. | 359/744 |
| 2008/0191121 A1 * | 8/2008 | Yoo et al. | 250/201.4 |

* cited by examiner

LASER BEAM POSITIONING SYSTEMS FOR MATERIAL PROCESSING AND METHODS FOR USING SUCH SYSTEMS

TECHNICAL FIELD

The present disclosure is directed generally toward laser beam positioning systems for material processing and methods for using such systems.

BACKGROUND

Lasers are ubiquitous devices used for testing, measuring, printing, cutting, marking, medical applications, communications, data transmission, semiconductor processing, and a number of other applications. Many types of lasers have been developed to meet different performance criteria for different applications. Engraving, cutting, marking, printing, and many other applications require relatively compact lasers that generate high power outputs and have beams with a desired shape and energy distribution. Laser-based processing systems, for example, can mark, cut, weld, or perform other types of surface modifications of material for a variety of different applications.

High-speed laser beam positioning systems are commonly used in laser processing systems for a variety of commercial applications. Conventional high-speed laser beam positioning systems, for example, typically include a plurality of optical elements in a laser beam path for directing and focusing the laser beam onto a workpiece. The optical elements generally include a beam-expander, a pair of electrically-driven rotating mirrors, and a flat field focusing lens. The beam expander is configured to increase the diameter of the laser beam before the beam passes through the flat field focusing lens to produce a focal point at the workpiece. Following beam expansion, the electrically-driven rotating mirrors can be positioned to guide the expanded beam from the beam expander to the flat field focusing lens, and ultimately toward the targeted workpiece.

One common application for such high-speed laser beam positioning systems is assembly line material processing in which laser systems are used to modify workpieces in mass quantity. These high-speed laser beam positioning systems can include precision optical elements to direct and condition the laser beam to provide accurate and focused delivery of the beam to the target workpieces in a variety of high-speed and high-throughput applications. Laser processing speeds and space constraints along the assembly line however, can affect throughput volume in such applications.

DETAILED DESCRIPTION

A. Overview

The present disclosure is directed generally toward laser beam positioning systems for material processing and methods for using such systems. One embodiment of a laser-based material processing system, for example, can include (a) a radiation source configured to produce a laser beam and direct the beam along a beam path toward a material processing area, and (b) a laser beam positioning assembly in the beam path. The laser beam positioning assembly can include a first focusing element, first and second reflective optical elements (e.g., movable mirrors), and a second focusing element. The first focusing element can focus the laser beam to a first focal point between the first and second reflective optical elements. The first and second reflective optical elements can direct the laser beam toward the material processing area while the laser beam has a decreasing or increasing cross-sectional dimension (e.g., diameter). The second focusing element can focus the laser beam and direct the beam toward a material processing area to modify a workpiece at least proximate to the material processing area.

The system can have several different configurations. For example, the first focusing element can focus the laser beam to change a substantially parallel laser beam propagation profile having an initial cross-sectional dimension to a converging beam propagation profile along the beam path progressing toward a first focal point. The first and/or second reflective optical elements can be in the beam path and reflect the converging laser beam toward the material processing area. In another embodiment, the first and/or second reflective optical elements can be positioned in the beam path following the first focal point and can reflect a diverging portion of the laser beam toward the material processing area.

Several embodiments of the invention are also directed toward methods for processing workpieces. For example, one embodiment of such a method can include directing a laser beam having a first beam propagation profile along a beam path. The method can also include focusing the laser beam with a first optical element to change the first beam propagation profile to a second, converging beam propagation profile. The method can further include changing a direction of the beam having the second converging propagation profile by reflecting the beam with a first reflective surface. The method can then include reflecting the laser beam with a second reflective surface to change the beam path direction from the second direction to a third direction different than the second direction. The method further includes focusing the laser beam with a second optical element, and directing the beam toward a material processing area.

Many specific details of certain embodiments of the disclosure are set forth in the following description and in FIGS. 1A-4 to provide a thorough understanding of these embodiments. A person skilled in the art, however, will understand that the disclosure may be practiced without several of these details or additional details can be added to the invention. Well-known structures and functions have not been shown or described in detail to avoid unnecessarily obscuring the description of the embodiments of the disclosure. Where the context permits, singular or plural terms may also include the plural or singular term, respectively. Moreover, unless the word "or" is expressly limited to mean only a single item exclusive from the other items in reference to a list of two or more items, the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of features are not precluded.

Figure 1A:
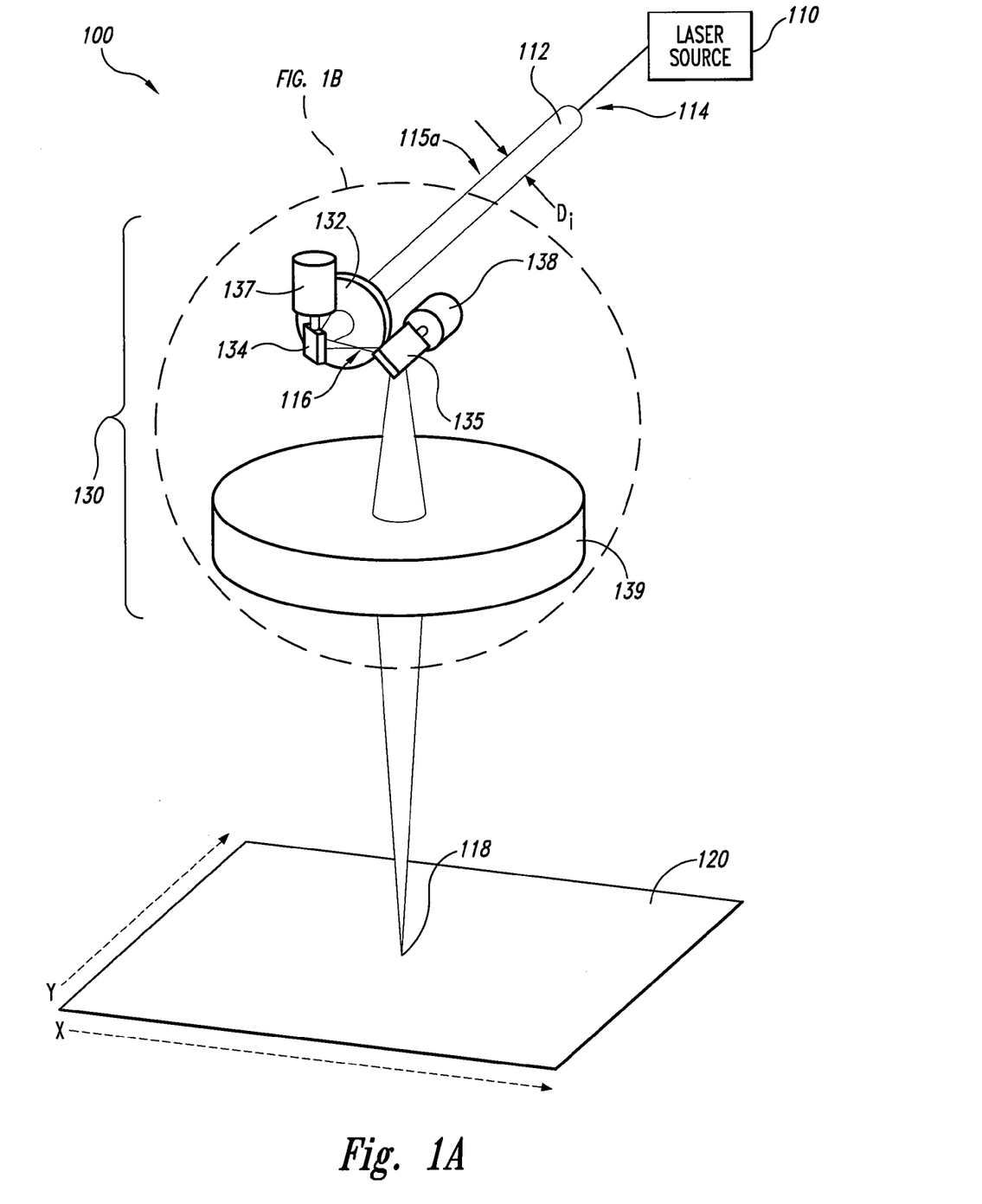
FIG. 1A is a partially schematic, isometric view illustrating a laser-based material processing system including a laser beam positioning assembly configured in accordance with an embodiment of the disclosure.

B. Embodiments of Laser Beam Positioning Systems and Methods for Using Such Systems FIG. 1A is a partially schematic, isometric view of a laser-based material processing system 100 configured in accordance with an embodiment of the disclosure. The laser processing system 100 includes (a) a laser or radiation source 110 (shown schematically) that directs a laser or radiation beam 112 along a beam path 114 toward a material processing area 120, and (b) a laser beam positioning assembly 130 between the laser source 110 and the material processing area 120 for guiding and/or focusing the laser beam 112 along the beam path 114.

The laser beam positioning assembly 130 can include, for example, a first focusing element 132, first and a second reflective optical elements 134 and 135 (e.g., electrically-driven mirrors, etc.), and a second focusing element 139 positioned to focus the beam 112 toward the material processing area 120. In one embodiment, the first and second focusing elements 132 and 139 and the first and second reflective optical elements 134 and 135 can be housed in a common enclosure (not shown). In other embodiments, the laser beam positioning assembly 130 can have other arrangements. For example, the second focusing element 139 can be housed in a separate enclosure.

The material processing area 120 can be at a desired location relative to the laser beam positioning assembly 130. A workpiece (not shown) can be positioned at least proximate to the material processing area 120 for processing (e.g., cutting, marking, welding, etching, etc.). The term "workpiece" is defined herein as any type of material by itself or in combination with one or more additional materials that can be irradiated, modified, manipulated, or otherwise affected by a radiation beam. In several embodiments, for example, the workpiece can include a generally nonporous material, such as metal, wood, plastic, rubber, and/or other suitable materials.

The laser source 110 is configured to emit the laser beam 112 with a desired configuration (i.e., size, shape, energy distribution, etc.). The laser source 110 can be any of a variety of radiation sources known in the art, such as a gas laser, a solid state laser, a semiconductor laser, a dye laser, a fiber laser, or a combination of these lasers. In other embodiments, the laser source 110 can also include other types of suitable laser systems and/or lamps. The nature of the source depends upon the intended application. For example, in systems 100 used for material marking, the laser source 110 can be a carbon dioxide gas laser or an Nd:YAG laser. In still further embodiments, the system 100 can include more than one laser source 110.

Figure 1B:
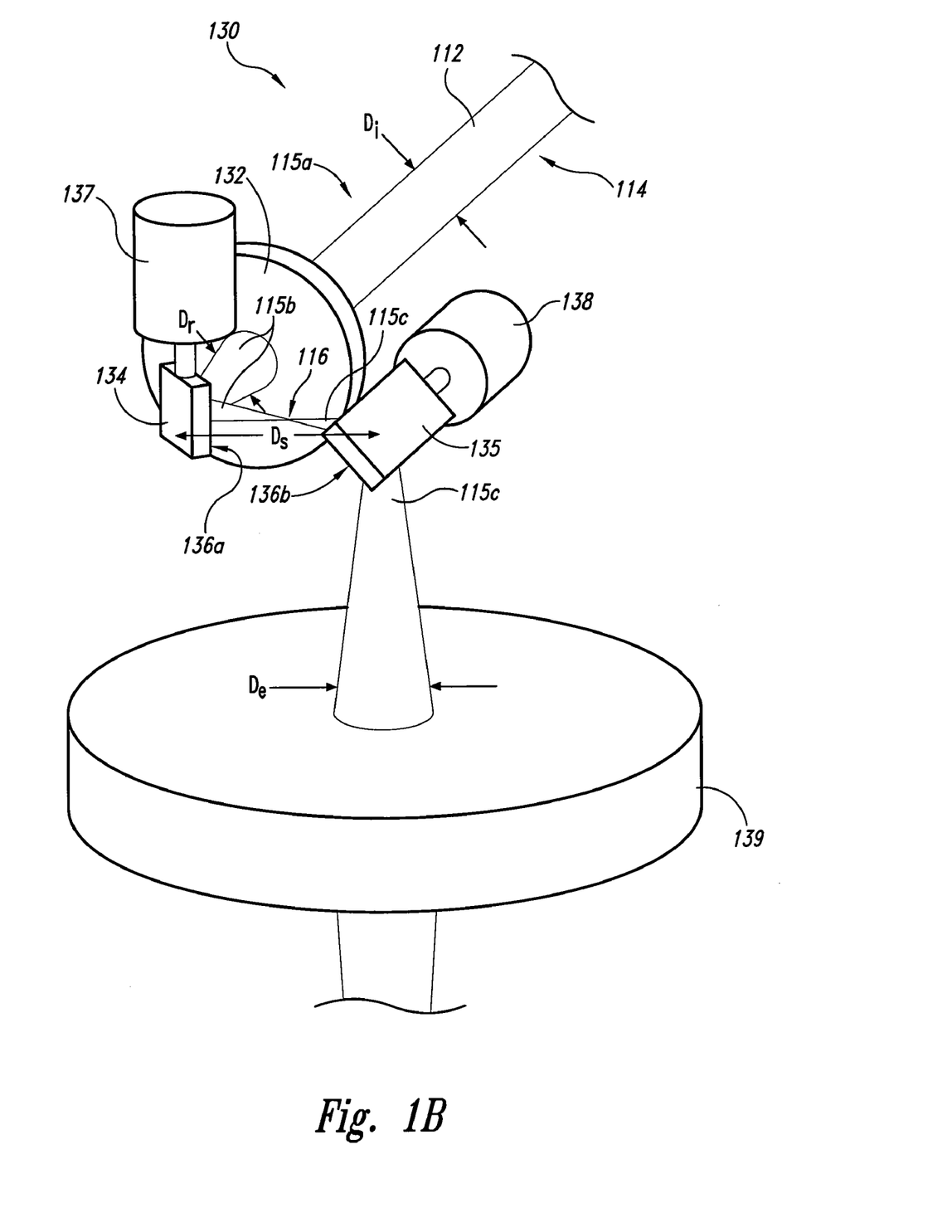
FIG. 1B is an enlarged view of the laser beam positioning assembly taken from the area 1B of FIG. 1A.

FIG. 1B is an enlarged view of the laser beam positioning assembly 130 from the area 1B of FIG. 1A. Referring to FIGS. 1A and 1B together, the laser source 110 emits the laser beam 112 having a first beam portion 115a with a substantially parallel (i.e., low divergence) beam propagation profile having a cross-sectional profile in a plane generally transverse to the beam path 114 with an initial dimension $D_i$ (e.g., diameter) along the entire first beam portion 115a. The first focusing element 132 in the beam path 114 is configured to focus the laser beam 112 from the first beam portion 115a along the beam path 114 to a first focal point 116 along a second beam portion 115b. For example, as the laser beam 112 passes through the first focusing element 132, the beam 112 changes from having a generally parallel beam propagation profile (as it does at the first beam portion 115a) to a converging beam propagation profile at the second beam portion 115b. More specifically, as the laser beam 112 is focused by the first focusing element 132, the laser beam 112 changes (or converges) from the initial cross-sectional dimension $D_i$ to decreasing cross-sectional dimensions $D_r$ as the beam 112 progresses along the beam path 114 toward the first focal point 116. As used herein, the term "converging" is defined as changing a beam from a first cross-sectional dimension in a plane generally transverse to a beam path to continuously decreasing cross-sectional dimensions less than the first cross-sectional dimension along the beam path.

In one embodiment, the first focusing element 132 includes a focusing lens having a focal length such that the first focal point 116 is formed approximately one focal length from the first focusing element 132. In some embodiments, for example, the first focusing element 132 can have a focal length of from approximately 25 mm to approximately 76 mm. In other embodiments, however, the focal length of the first focusing element 132 can be less than 25 mm or greater than 76 mm. In still other embodiments, the first focusing element 132 can include a generally concave mirror or another suitable optical feature configured to focus the laser beam 112 toward the first focal point 116.

The laser beam positioning assembly 130 includes the first and second reflective optical elements 134 and 135 in or along the beam path between the first focusing element 132 and the material processing area 120 for directing the laser beam 112 toward the material processing area 120. The first and second reflective optical elements 134 and 135, for example, can include first and second mirrors or other reflective surfaces that can independently pivot, rotate, or move relative to each other and the other components of the system 100 to alter a position (e.g., a focal position, an X-axis position, Y-axis position, etc.) of the laser beam 112 relative to the material processing area 120. In the embodiment illustrated in FIGS. 1A and 1B, for example, the first and second reflective optical elements 134 and 135 include electrically-driven rotating mirrors or galvanometer-driven mirrors operably coupled to motors 137 and 138, respectively. The first and second mirrors 134 and 135 are configured to pivot or rotate and change at least one of an X-axis or Y-axis position of the beam 112 relative to the material processing area 120 and position the laser beam 112 at a plurality of target spots relative to the material processing area 120.

In the embodiment shown in FIGS. 1A and 1B, the first and second reflective optical elements 134 and 135 are generally rectilinear. In other embodiments, however, the reflective optical elements 134 and 135 can have a variety of other shapes (e.g., generally circular, elliptical, polygonal, geometric, non-geometric, etc.). The first and second reflective optical elements 134 and 135 each include reflective surfaces 136a and 136b, respectively, having a reflective area dimension (e.g., length, width, diameter, etc.). In one embodiment, the reflective area dimension can be of from approximately 1 mm to approximately 6 mm. In still further embodiments, the first and/or second reflective elements 134 and 135 can have different dimensions (e.g., the reflective surfaces 136a and 136b can have other dimensions less than 1 mm or greater than 6 mm) and/or have reflective surfaces with other configurations.

In one embodiment, the reflective surfaces 136a and 136b of the first and second reflective optical elements 134 and 135 can be generally planar. In another embodiment, however, the second reflective element 135 can include a generally convex reflective surface 136b such that the laser beam 112 is reflected and expanded as it approaches the second focusing element 139. In still further embodiments, the first and/or second reflective surfaces 136a and 136b can have a variety of other configurations.

In some embodiments, the reflective surfaces 136a and 136b are configured to reflect the laser beam 112 at a high power density (e.g., approximately 5000 W/cm² when using a 50 W laser source 110). In these configurations, the reflective surfaces 136a and 136b can be fabricated from enhanced metal (e.g., silver, gold, etc.), with or without a protective film. In other embodiments, the reflective surfaces 136a and 136b can include a dielectric coating consisting of multiple layers of dielectric materials. These high reflectivity surfaces 136a and 136b can have a reflectivity value of from approximately 99% to approximately 99.9%. In other embodiments, however, the reflective surfaces 136a and 136b can have a different reflectivity value.

As shown in FIGS. 1A and 1B, the first reflective optical element 134 is in the beam path 114 between the first focusing element 132 and the first focal point 116. The first reflective optical element 134 is configured to reflect the converging second beam portion 115b toward the second reflective optical element 135. The second reflective optical element 135 is configured to reflect a third beam portion 115c having a diverging beam propagation profile (at a point in the beam path 114 following the first focal point 116) and direct the laser beam 112 toward the material processing area 120. As used herein, the term "diverging" is defined as changing a beam from a first cross-sectional dimension in a plane generally transverse to a beam path to increasing cross-sectional dimensions greater than an initial cross-sectional dimension along the beam path. In the embodiment illustrated in FIGS. 1A and 1B, the diverging third beam portion 115c impinges on the second reflective optical element 135 with a reduced cross-sectional dimension $D_r$. Specifically, the second reflective optical element 135 reflects the diverging third beam portion 115c before the laser beam 112 expands to a dimension equal to or greater than the initial dimension $D_i$ of the first beam portion 115a. In this embodiment, the first focal point 116 is between the first and second reflective optical elements 134 and 135, and the diverging third beam portion 115c follows the first focal point 116 in the beam path 114.

One feature of the laser beam positioning assembly 130 described above with reference to FIGS. 1A and 1B is that the first and second reflective optical elements 134 and 135 can be smaller in size as compared to the reflective elements used in conventional laser beam positioning systems. For example, because the dimension $D_r$ of the focused laser beam 112 is reduced, the surface area of the reflective surfaces 136a and 136b of the corresponding reflective optical elements 134 and 135 can also be reduced. In one specific example, a 50 W laser source 110 can impinge on the reflective surfaces 136a and 136b of the corresponding reflective optical elements 134 and 135 with an approximately 1 mm² spot size, resulting in a power density of approximately 5000 W/cm² at the reflective surfaces. Mirrors with state-of-the-art coatings can withstand a power density of approximately 5000 W/cm² without catastrophic failure. Accordingly, the surface area of the reflective surfaces 136a and 136b can be significantly reduced as compared to the surface areas required in conventional beam positioning systems.

A separation distance $D_s$ along the beam path 114 between the first and second reflective optical elements 134 and 135 can also be reduced as compared to the separation distance typically required between the larger mirrors of conventional laser beam positioning systems. In the illustrated embodiment, for example, the separation distance $D_s$ can be from approximately 6 mm to approximately 26 mm. In other embodiments, however, the distance $D_s$ can be greater or smaller than 6 mm to 26 mm.

As shown in FIGS. 1A and 1B, the second focusing element 139 can be positioned in the beam path 114 between the second reflective optical element 135 and the material processing area 120. The second focusing element 139 can include, for example, a focusing lens or other optical feature having a desired focal length. In several embodiments, the second focusing element 139 can include one or more lenses to form the optical equivalent of a flat-field lens configured to focus the diverging third beam portion 115c.

The second focusing element 139 is configured to receive the diverging third beam portion 115c of the laser beam 112 and produce a second focal point 118 in the beam path 114 at or proximate to a workpiece (not shown) in the material processing area 120. More specifically, the second focusing element 139 can be positioned in the diverging third beam portion 115c of the laser beam 112 having an expanded dimension $D_e$ greater than the initial dimension $D_i$. The diverging third beam portion 115c can provide a sufficiently expanded beam 112 for refocusing to the second focal point 118 with a small focal spot. One of ordinary skill in the art will recognize that through beam expansion and refocusing, a smaller focal spot size at the focal plane (i.e., the second focal point 118) can be achieved, resulting in a sharper, higher-resolution modification (e.g., image, etching, marking, cutting, etc.) on the workpiece.

In operation, the first reflective optical element 134 can alter a beam path direction from a first direction to a second direction (along the second beam portion 115b) that is different from the first direction. The second direction, for example, can be toward the second reflective optical element 135. The first and second reflective optical elements 134 and 135 accordingly direct or guide second converging and third diverging beam portions 115b and 115c, respectively, that impinge on the first and second reflective surfaces 136a and 136b with a reduced cross-sectional dimension (i.e., reduced dimension $D_r$) less than the initial beam dimension $D_i$ or the expanded beam dimension $D_e$. Upon receiving the laser beam 112, the second reflective optical element 135 can reflect the laser beam 112 and alter the beam path direction from the second beam direction to a third beam direction (along the third beam portion 115c) that is different from the second direction. The third direction can be toward the second focusing element 139 and/or the material processing area 120. After the laser beam 112 is received and focused by the second focusing element 139, the laser beam 112 can be directed to the material processing area and the beam 112 can mark, etch, weld, cut, etc. a portion of a target material or workpiece (not shown) in the material processing area 120.

In one embodiment, the target material or workpiece (not shown) can have an outer surface and one or more interior portions at intermediate depths within the material. For example, the target material or workpiece can have a thickness with one or more depth-wise layers within the thickness. The second focusing element 139 can be configured to focus the laser beam 112 to produce a focal point at the outer surface and/or within the volume of the target material.

There is a continuous drive to reduce the size of laser processing systems while simultaneously increasing the laser processing speed for such systems (e.g., for use in assembly line material processing application and other high-speed marking applications). The system 100 described above is expected to be significantly smaller and faster than conventional laser processing systems, while still providing a desired beam intensity and small focal spot size at the target workpiece. For example, the laser beam positioning assembly 130 illustrated in FIGS. 1A and 1B can have a smaller size and profile than laser beam positioning systems designed using conventional optical elements, such as beam expanders. By incorporating a first focusing element 132 in the beam path 114 to reduce a beam dimension from the initial dimension $D_i$ to the reduced dimensions $D_r$, the first and second reflective optical elements 134 and 135 can have reduced dimensions (e.g., diameter, length, width, weight, etc.) while reflecting second converging and/or third diverging portions 115b/115c of the laser beam 112 along the beam path 114. The reduced dimensions of these reflective optical elements 134 and 135, as well as a reduction in the motor size necessary to rotate their reflective surfaces, is expected to significantly reduce the overall size of the assembly 130.

Another advantage of the system 100 including the laser beam positioning assembly 130 described above is that the reduced three dimensional size of the various components (e.g., the reflective optical elements 134 and 135, the corresponding motors 137 and 138, etc.) is expected to result in a lower mass as well as a lower moment of inertia of the reflective optical elements 134 and 135. The moment of inertia is a function of both the mass (m) as well as the distance (r) of the mass from the rotational axis of the reflective optical elements 134 and 135. This relationship can be defined by the following equation:

$$I=mr^2$$

An overall size reduction of the reflective optical elements 134 and 135 is expected to decrease values for m and, more importantly, for r. While reducing the mass m can reduce the moment of inertia I, the reduction in r results in a much more dramatic reduction in the moment of inertia I as indicated by the equation above. Reducing the size of the reflective optical elements 134 and 135 can enable higher acceleration during movement (e.g., rotation of the reflective surfaces 136a and 136b, etc.), and result in faster laser positioning speed and improved performance as compared to conventional laser processing systems.

Moreover, desired levels of image resolution can be maintained with the system 100 because as the beam 112 travels beyond the first focal point 116 of the first focusing element 132, the beam 112 continuously expands along the third diverging portion 115c of the beam 112. As discussed above, the second focusing element 139 (e.g., a flat-field lens, etc.) can be positioned in the beam path 114 at the third diverging portion 115c of the laser beam 112 and configured to focus this expanding portion of the beam 112 to a small spot size at or within the material processing area 120 at resolutions comparable to larger, heavier conventional laser beam positioning systems.

Figure 2:
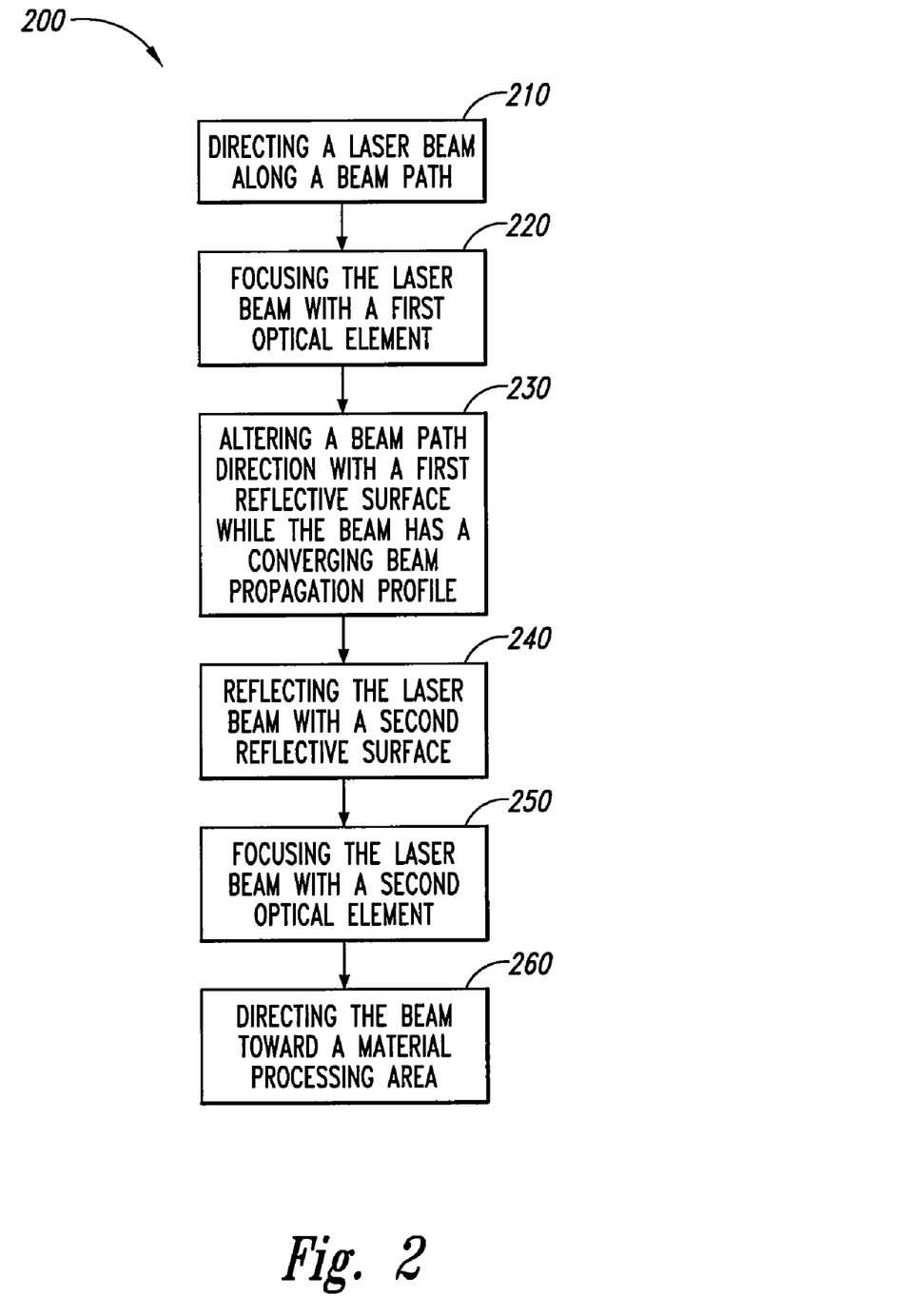
FIG. 2 is a flow chart illustrating a method for processing a workpiece in accordance with an embodiment of the disclosure.

FIG. 2 is a flow chart of an embodiment of a method 200 for processing a workpiece using a laser in accordance with the invention. The method 200 can be performed, for example, using the system 100 described above or other suitable laser-based material processing systems. The method 200 can include directing a laser beam having a first beam propagation profile along a beam path (block 210). The method 200 can further include focusing the laser beam with a first optical element to change the first beam propagation profile to a second converging beam propagation profile (block 220). Additionally, the method 200 can include changing or altering a beam path direction of the beam having the second converging propagation profile by reflecting the beam with a first reflective surface (block 230). Altering the beam path direction, for example, can include changing the beam path from a first direction to a second direction different from the first direction. After block 230, the method 200 can further include reflecting the laser beam with a second reflective surface to change the beam path direction from the second direction to a third direction different than the second direction (block 240). The method 200 can also include focusing the laser beam with a second optical element (block 250), and directing the beam toward a material processing area (block 260).

Figure 3:
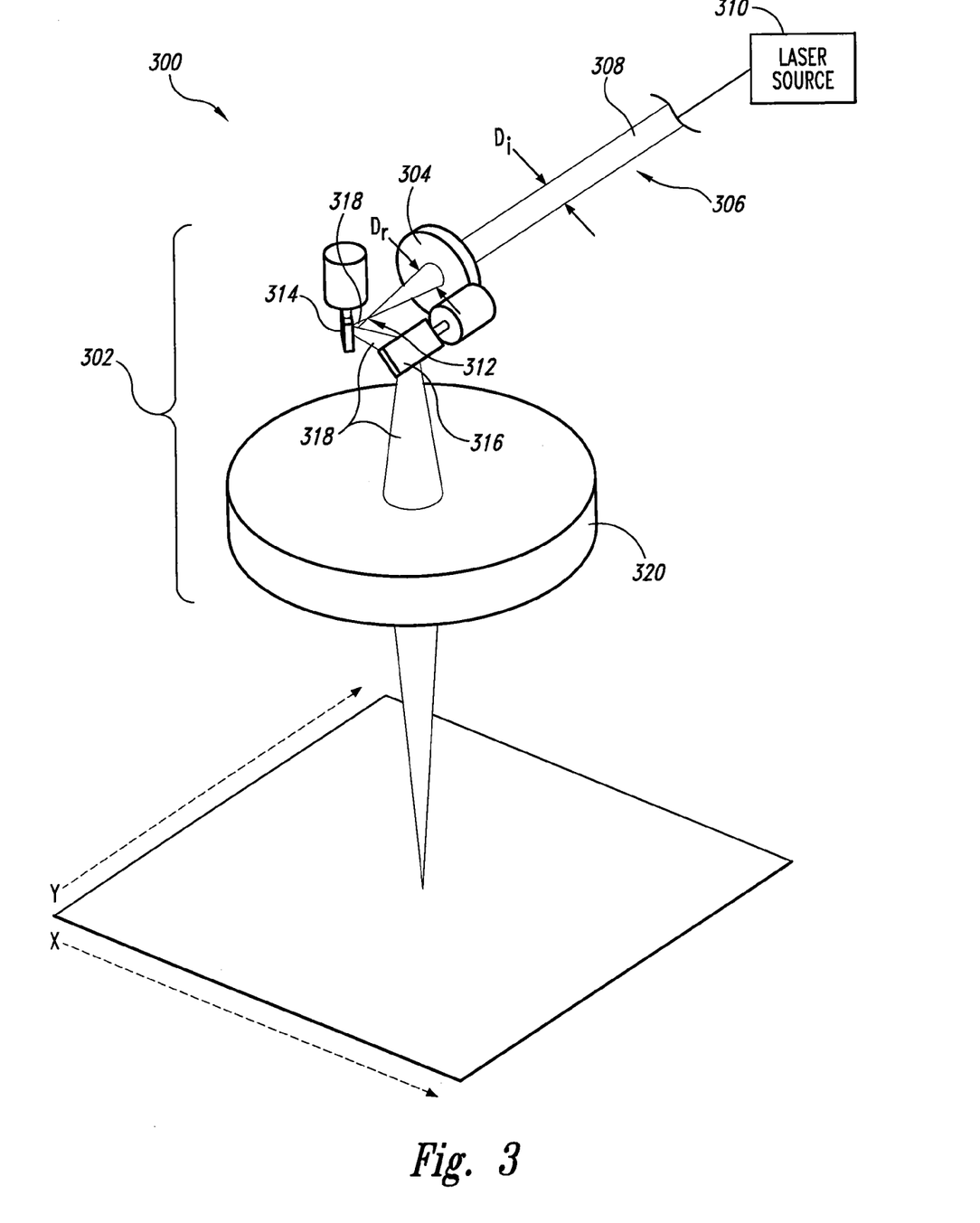
FIG. 3 is a partially schematic, isometric view illustrating a laser-based material processing system configured in accordance with another embodiment of the disclosure.
Figure 4:
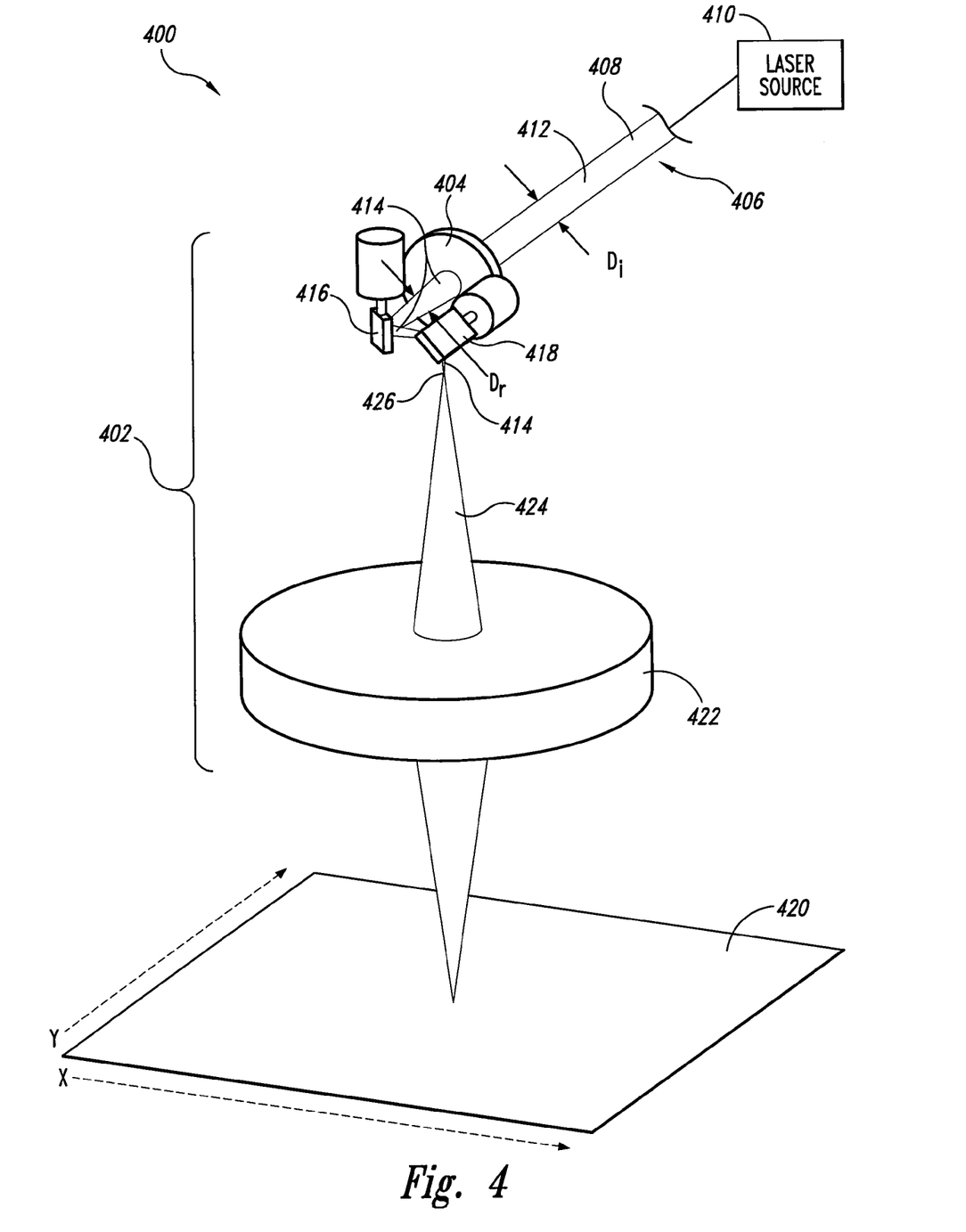
FIG. 4 is a partially schematic, isometric view illustrating a laser-based material processing system configured in accordance with a further embodiment of the disclosure.

C. Additional Embodiments of Laser Beam Positioning Systems and Methods for Using Such Systems FIGS. 3 and 4 illustrate laser beam positioning systems for material processing configured in accordance with additional embodiments of the disclosure. These systems can include several features generally similar to the system 100 described above with respect to FIGS. 1A and 1B. The systems described below can also have many of the same advantages as the system 100 described above with respect to FIGS. 1A and 1B.

FIG. 3, for example, is a partially schematic, isometric view of a laser-based material processing system 300 in accordance with another embodiment of the disclosure. The system 300 can be generally similar to the system 100 described above with respect to FIG. 1A. The system 300 differs from the system 100, however, in that the system 300 includes a laser beam positioning assembly 302 having a different configuration than the laser beam positioning assembly 130. More specifically, the system 300 includes first and second reflective optical elements 314 and 316 that are both configured to intercept and reflect a diverging portion 318 of a laser beam 308 following a first focal point 312. The laser beam positioning assembly 302 also includes a first focusing element 304 in a beam path 306 configured to focus the laser beam 308 emitted by a laser source 310 (shown schematically) to the first focal point 312. The laser beam 308 can have a generally parallel beam propagation profile with an initial cross-sectional dimension $D_i$ (e.g., diameter). This parallel beam propagation profile is changed to a converging beam propagation profile having decreasing cross-sectional dimensions $D_r$ as the beam 308 passes through the first focusing element 304.

As shown in FIG. 3, the laser beam 308 has expanding or increasing cross-sectional dimensions as it passes through the first focal point 312 and through the diverging portion 318. The diverging portion 318 impinges on the first and second reflective optical elements 314 and 316 with reduced cross-sectional dimensions $D_r$. Specifically, the first and second reflective optical elements 314 and 316 reflect the diverging portion 318 before the laser beam 308 expands to a dimension equal to or greater than the initial dimension $D_i$ of the parallel beam propagation profile. The first reflective optical element 314 is configured to reflect the diverging portion 318 of the laser beam 308 toward the second reflective optical element 316. The second reflective optical element 316 is configured to receive the diverging laser beam 308 (at a point in the beam path 306 when the beam 308 has a reduced cross-sectional dimension $D_r$) and reflect the beam 308 toward a second focusing element 320. The second focusing element 320 can be configured to receive and focus the diverging portion 318 of the beam 308.

FIG. 4 is a partially schematic, isometric view of a laser-based material processing system 400 in accordance with still another embodiment of the disclosure. The system 400 differs from the systems 100 and 300 described above with respect to FIGS. 1A and 3, respectfully, in that the system 400 includes a laser beam positioning assembly 402 having a different configuration than the laser positioning assemblies 130 and 302. More specifically, the system 400 includes first and second reflective optical elements 416 and 418 that are both configured to intercept and reflect a converging portion 414 of a laser beam 408 following focusing of the beam by a first focusing element 404. The first focusing element 404 is configured to focus the laser beam 408 from a parallel beam propagation profile 412 having an initial cross-sectional dimension $D_i$ (e.g., diameter,) to the converging beam propagation profile 414 having decreasing cross-sectional dimensions $D_r$.

In the embodiment illustrated in FIG. 4, the first and second reflective optical elements 416 and 418 are positioned in the converging portion 414 of the laser beam 408 along the beam path 406 such that the first reflective optical element 416 reflects the laser beam 408 toward the second reflective optical element 418 while the beam 408 is converging. The second reflective optical element 418 is also positioned in the converging portion 414 of the laser beam 408 along the beam path 406 to receive and reflect the laser beam 408 toward the material processing area 420. The system 400 can also include a second focusing element 422 to focus a diverging portion 424 of the laser beam 408. In the illustrated embodiment, the diverging portion 424 of the beam 408 follows a first focal point 426 in the beam path 406.

From the foregoing, it will be appreciated that specific embodiments of the disclosure have been described herein for purposes of illustration, but that various modifications can be made without deviating from the spirit and scope of the disclosure. For example, although many of the embodiments are described herein with respect to laser-based material processing systems, other types of laser beam positioning systems (e.g., laser printers, CD players, CD-ROM devices, aiming/leveling devices, spectrometers, stereo lithography equipment, laser pointers, laser scanners, etc.) may be within the scope of the disclosure. Moreover, specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the invention. Accordingly, embodiments of the disclosure are not limited except as by the appended claims.

We claim:

1. A laser-based material processing system, the system comprising:
   a radiation source configured to produce a laser beam and direct the laser beam along a beam path toward a material processing area; and
   a laser beam positioning assembly in the beam path, the laser beam positioning assembly including—
      a first focusing element configured to focus the beam along the beam path to a first focal point;
      a first reflective optical element and a second reflective optical element in the beam path, wherein the first reflective optical element is configured to reflect a converging portion of the beam toward the second reflective optical element, and wherein the first focal point is between the first and second reflective optical elements, and further wherein the second reflective optical element is configured to reflect a diverging portion of the beam toward the material processing area; and
      a second focusing element in the beam path between the second reflective optical element and the material processing area.

2. The system of claim 1 wherein the first and second reflective optical elements include electrically-driven rotating mirrors.

3. The system of claim 1 wherein the first and second reflective optical elements include rotating galvanometer-driven mirrors that move to change at least one of an X-axis and Y-axis position of the beam relative to the material processing area.

4. The system of claim 1 wherein the second focusing element includes a flat field lens.

5. The system of claim 1 wherein the second focusing element is configured to focus the diverging portion of the beam and produce a second focal point at least proximate to the material processing area.

6. A laser assembly for processing material, the laser assembly comprising:
   a material processing area;
   a laser source configured to emit a laser beam directed along a beam path toward the material processing area;
   a first lens in the beam path and configured to focus the laser beam to a first focal point in the beam path, the first focal point being before the material processing area;
   a first actuatable mirror and a second actuatable mirror in the beam path, wherein the first mirror is positioned between the first lens and the first focal point and configured to reflect a converging portion of the laser beam toward the second mirror, and wherein the second mirror is between the first focal point and the material processing area and configured to reflect a diverging portion of the laser beam toward the material processing area; and
   a second lens in the beam path between the second mirror and the material processing area and configured to focus the diverging portion of the laser beam.

7. The assembly of claim 6 wherein:
   the first mirror includes a first galvanometer-driven mirror; and
   the second mirror includes a second galvanometer mirror, and wherein the first and second galvanometer-driven mirrors rotate relative to the beam path and each other to change a position of the laser beam relative to the material processing area.

8. The assembly of claim 6 wherein the first and second mirrors are separated by a distance of from approximately 6 mm to approximately 26 mm.

9. The assembly of claim 6 wherein the first mirror has a generally planar reflective surface, and the second mirror has a generally convex reflective surface.

10. The assembly of claim 6 wherein the first lens has a focal length of from approximately 25 mm to approximately 76 mm.

11. The assembly of claim 6 wherein the second lens comprises a flat field lens.

12. A method for modifying a workpiece, the method comprising:
   directing a laser beam along a beam path toward a first optical element, the laser beam having a first beam propagation profile along the beam path;
   focusing the laser beam with the first optical element to change the first beam propagation profile to a second converging beam propagation profile along the beam path;
   changing a beam path direction from a first direction to a second direction different from the first direction by reflecting the laser beam with a first reflective surface after changing the beam propagation profile from the first beam propagation profile to the second converging beam propagation profile;

reflecting the laser beam with a second reflective surface and changing the beam path direction from the second direction to a third direction different from the second direction toward a second optical element; and focusing the laser beam with the second optical element and directing the beam toward a material processing area.

13. The method of claim 12 wherein focusing the laser beam with the first optical element includes producing a first focal point along the beam path.

14. The method of claim 13 wherein following the first focal point, the laser beam changes from the second converging beam propagation profile to a third diverging beam propagation profile, and wherein reflecting the laser beam with the second reflective surface includes reflecting the laser beam having the third diverging beam propagation profile.

15. The method of claim 12 wherein reflecting the laser beam with the first and second reflective surfaces includes reflecting the laser beam with galvanometer-driven mirrors configured to rotate relative to each other and the laser beam to change the beam path direction.

16. The method of claim 12, further comprising moving at least one of a first reflective surface and a second reflective surface to vary a position of the laser beam relative to the material processing area.

17. The method of claim 12, further comprising irradiating a portion of a workpiece at least proximate to the material processing area with the laser beam after focusing the laser beam.

18. The method of claim 12, further comprising selecting a target material having an outer surface and an interior volume, and wherein focusing the laser beam with the second optical element includes impinging a focal point on at least one of the outer surface and the interior volume.

19. The method of claim 12 wherein reflecting the laser beam with a first reflective surface includes reflecting the beam with a first reflective surface having a first reflective area dimension of from approximately 1 mm to approximately 6 mm, and wherein reflecting the laser beam with a second reflective surface includes reflecting the beam with a second reflective surface having a second reflective area dimension of from approximately 1 mm to approximately 6 mm.

20. The method of claim 12 wherein reflecting the laser beam with a first reflective surface includes reflecting the beam with a first reflective surface having a reflectivity value of approximately 99% to approximately 99.9%, and wherein reflecting the laser beam with a second reflective surface includes reflecting the beam with a second reflective surface having a reflectivity value of approximately 99% to approximately 99.9%.

21. The method of claim 12 wherein focusing the laser beam with a first optical element includes focusing with a first optical element having a focal length of approximately 25 mm to approximately 76 mm.

22. The method of claim 12 wherein after changing the beam path direction from the first direction to the second direction, and before changing the beam path direction from the second direction to the third direction, the laser beam travels a distance of from approximately 6 mm to approximately 26 mm.

23. A method for processing a workpiece using a laser, the method comprising:

directing a laser beam along a beam path toward a material processing area, the beam having an initial beam dimension in a plane generally transverse to the beam path;

passing the laser beam through a first optical element, wherein the first optical element focuses the beam to a focal point along the beam path, and wherein the focused beam has (a) a decreasing beam dimension as the beam progresses along the beam path toward the focal point, and (b) an increasing beam dimension as the beam progresses along the beam path following the focal point;

impinging the beam having the decreasing or the increasing beam dimension on a first reflective element along the beam path and guiding the laser beam toward a second reflective element;

directing the beam along the beam path from the first reflective element to the second reflective element;

reflecting the laser beam toward a second optical element with the second reflective element before the beam expands to a dimension equal to or greater than the initial dimension; and passing the laser beam through the second optical element and toward the material processing area.

24. The method of claim 23 wherein the second optical element focuses the laser beam at least proximate to a surface of a material being processed.

25. The method of claim 23 wherein:

impinging the beam on a first reflective element includes impinging the beam having a first beam dimension less than the initial beam dimension; and reflecting the laser beam toward a second reflective element includes reflecting the beam having a second beam dimension less than the initial beam dimension, and wherein the first beam dimension is generally the same as the second beam dimension.

26. The method of claim 23 wherein:

impinging the beam on a first reflective element includes impinging the beam having a first beam dimension less than the initial beam dimension; and reflecting the laser beam toward a second reflective element includes reflecting the beam having a second beam dimension less than the initial beam dimension, and wherein the first beam dimension is greater than or less than the second beam dimension.

27. The method of claim 23, further comprising changing a reflection angle of at least one of the first and second reflective elements to change a position of the laser beam relative to the material processing area.

28. The method of claim 23 wherein impinging the beam with the first reflective element includes impinging with a first electrically-driven rotating mirror, and wherein reflecting the beam with the second reflective element includes reflecting with a second electrically-driven rotating mirror.

* * * * *